Figure 1:
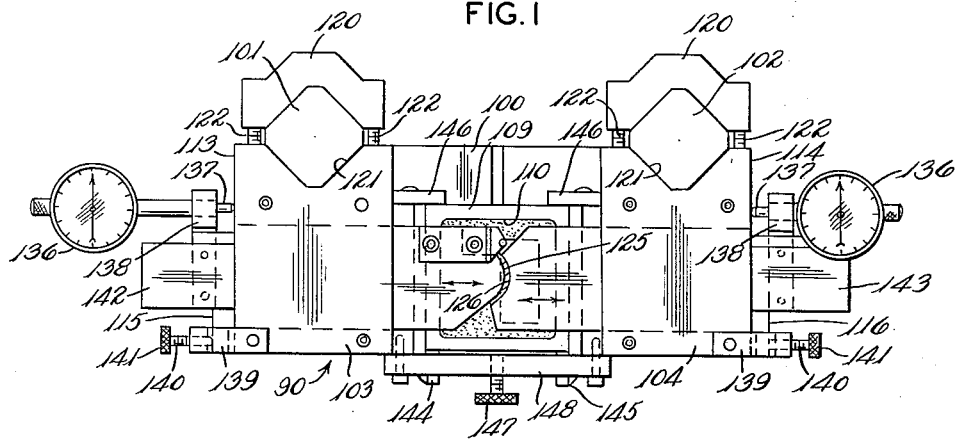

Sept. 12, 1961 M. A. HERMAN 2,999,282
APPARATUS TO CENTER ARTICLES IN A MATRIX
Filed March 18, 1960 2 Sheets-Sheet 1

*INVENTOR.*
MARTIN A. HERMAN
BY
Oldham & Oldham
ATTYS.

Sept. 12, 1961  M. A. HERMAN  2,999,282
APPARATUS TO CENTER ARTICLES IN A MATRIX
Filed March 18, 1960  2 Sheets-Sheet 2

INVENTOR.
MARTIN A. HERMAN

BY

ATTYS.

United States Patent Office 2,999,282
Patented Sept. 12, 1961

2,999,282
APPARATUS TO CENTER ARTICLES IN A MATRIX
Martin A. Herman, 11606 Edgewater Drive,
Cleveland, Ohio
Filed Mar. 18, 1960, Ser. No. 16,013
9 Claims. (Cl. 22—116)

The present inventions relate to the forming of matrices about articles so that such articles will be properly centered, or located in the matrix, and the invention particularly relates to apparatus for positioning a mold in a fixed position and for accurately and adjustably positioning a test article within the mold cavity whereby a matrix formed in the mold and in which the article is embedded will have the article properly positioned in the matrix.

Heretofore in the production of articles, such as turbine or jet blades or buckets, these articles frequently are made with portions thereof finished to the desired air foil contour or shape, but with the base or root of the blades or buckets requiring further machining thereon for finishing them. The usual procedure has been to secure the mold in a fixed position and then to place the article, such as the jet blade, with the air foil contour thereof extending into the mold and bring proper templates into engagement with this jet blade to presumably center it in the mold cavity. Then a matrix forming material has been poured around the jet blade and solidified, and the jet blade has been positioned by the matrix material in a lathe or other machine for finishing the machining or grinding of the root or base of the jet blade, for example. However, if these air foil contours are not made exactly to the size provided, it has been impossible by prior types of apparatus to center these jet blades properly in the mold cavity for forming a matrix therearound. This centering action has been rendered more difficult because of the tolerances provided for the jet baldes, such as 4 to 10 $\frac{1}{1000}$ of an inch so that if these jet blades use some of the tolerance permitted, all of the tolerance might appear on one face or surface of the jet blade and this would obviously throw any templates brought into engagement therewith out of balance with the actual center line, or stacking point of the jet blade.

Furthermore, in some instances in the past, it has been difficult to get a good flow of the matrix forming material around the article to be embedded in a matrix, and a good embedment of the article in the matrix, as many of these jet blades have been positioned on a generally horizontal axis for embedment in a matrix.

The general object of the present invention is to provide a novel and improved apparatus for properly centering or locating articles in a mold cavity for forming a matrix around the article in which the article is exactly positioned or centered, as desired.

Another object of the invention is to provide apparatus for fixedly positioning a mold for receiving an article therein and to form a matrix therearound, and with the article positioning means being adjustable with relation to the mold and mold cavity.

A further object of the invention is to position an article to be embedded in a matrix on a vertical axis and to adjust the article in a horizontal plane for locating the article in a mold cavity.

Further objects of the invention are to provide positioning apparatus that can be used with molds of any desired type or shape and have any suitable mold cavities formed therein, to provide any desired shape of matrix in good, fixed engagement with the test article but leaving a portion of such article exposed from the matrix body; to cool matrix forming material quickly in apparatus of the class described, and to seal part of a mold cavity by the article positioning templates provided therefor.

The foregoing and other objects and advantages of the invention will be made more apparent as the specification proceeds.

Figure 2:
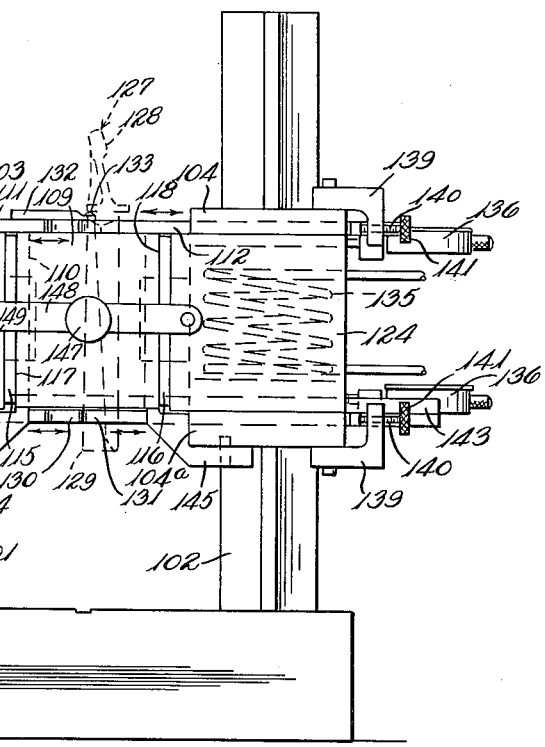
Figure 3:
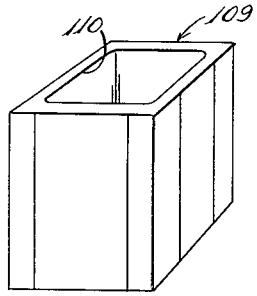
Figure 4:
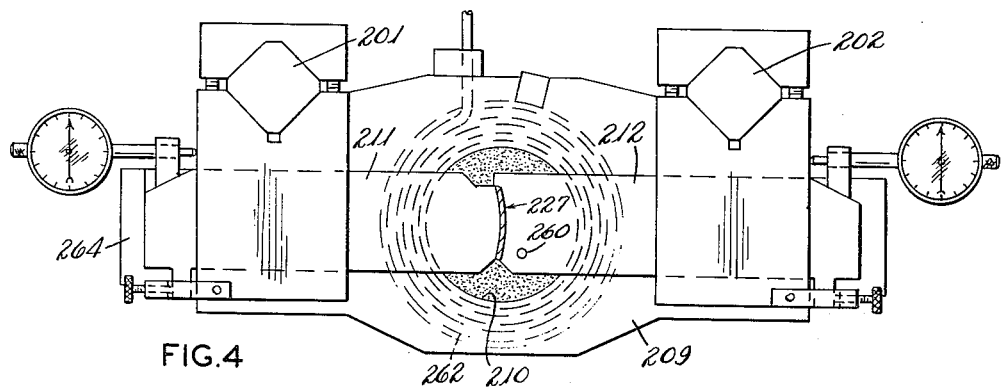
Figure 5:
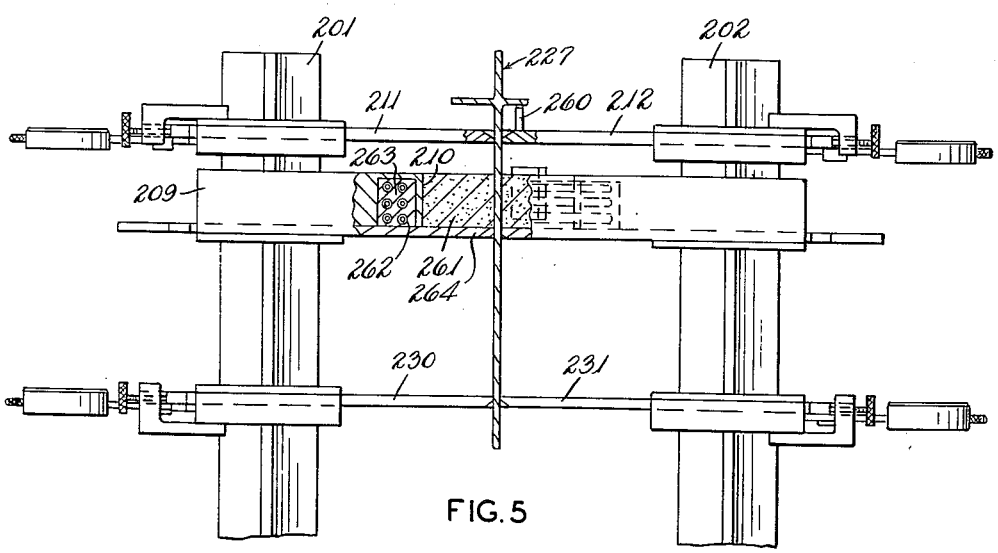

For a better understanding of the present invention, attention is directed to the accompanying drawings which illustrate preferred embodiments of the present invention, and wherein:

FIG. 1 is a plan of apparatus of the invention;
FIG. 2 is an elevation of the apparatus of the invention with an article to be centered indicated therein;
FIG. 3 is a perspective view of a typical mold used in association with the apparatus of the invention;
FIG. 4 is a plan view of a modified type of apparatus of the invention;
FIG. 5 is a side elevation, partially broken away and shown in vertical section, of the apparatus of FIG. 4; and
FIG. 6 is a diagrammatic illustration of the apparatus and principles of the invention.

When referring to corresponding members shown in the specification and referred to in the drawings, corresponding numerals are used to facilitate comparison therebetween.

Figure 6:
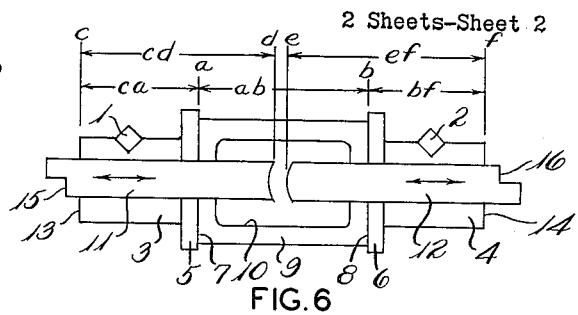

In order to understand the principles of operation of the present apparatus, reference is first directed to FIG. 6 in the attached drawings. This drawing diagrammatically shows portions of the present apparatus and illustrates some of the adjustment movement provided therein. Thus FIG. 6 shows a pair of spaced, parallel uprights 1 and 2 that are supported in any desired manner, usually on some type of a conventional support base. Each of these uprights has at least one and usually a pair of vertically spaced support means, or cartridges 3 and 4 operatively secured thereto. In this view, only one cartridge is seen on each of the uprights. The support cartridges 3 and 4 have locator plates 5 and 6 suitably operatively secured thereto and with the adjacent opposed laterally inner surfaces 7 and 8 on each of these locator plates 5 and 6, respectively, being accurately formed and being positioned in parallel vertical planes. A suitable mold 9 is operatively secured between these adjacent and opposed inner faces 7 and 8 to be accurately and fixedly positioned thereby. A mold cavity 10 of desired contour is formed in the mold 9 and normally is centered with relation to the faces 7 and 8 of the locator plates 5 and 6. Each of the support cartridges 3 and 4 slidably receives a template 11 or 12 thereon. These templates 11 and 12 normally protrude from the support cartridges 3 and 4 in both laterally inwardly and laterally outwardly directions. The laterally outer surfaces of the support cartridges 3 and 4, indicated at 13 and 14, respectively, in the drawings, are formed to extend in vertical planes and form reference surfaces in the apparatus of the invention.

The templates 11 and 12 have contoured inner surfaces indicated at D and E in the drawing and such surfaces are adapted to engage a test article, such as a jet blade or bucket therebetween. Some reference surface is operatively associated with or formed on the laterally outer end of each of the templates 11 and 12 and such surfaces are indicated at 15 and 16 in the drawing. Hence, as the distance between the gaging or reference surface 15 and the point D on the template 11, for example, is known, or is made to a given dimension, and with the corresponding distance between the inner point E and the laterally outer gaging surface 16 on the template 12 is known, as are the distances between the faces 7 and 8 and the locator or gaging surfaces 13 and 14, respectively, the templates 11 and 12 can be so positioned as to be centered with relation to the mold cavity 10. As described hereinafter in more detail, these locator, or adjustment means can be positively actuated to move the templates 11 and 12 slight distances accurately and effect the desired centering of the cavity or space between the points D and E to locate it properly with relation to the mold cavity 10 to position the test article accurately therein. The test article is carried by one of the templates in an accurate position thereon. Hence, as matrix material is poured into the mold cavity 10, it will then flow around the test article and solidify around the test article that is retained in its given position.

When considering the distances illustrated on the drawing, it will be seen that the distance between the locator or gaging faces is shown to be the distance AB and with the effective length of each of the support cartridges 3 and 4 being indicated by the lines AC and BF, it then becomes a mathematical problem to center the known length templates indicated by CD and EF with relation to the desired center or position for a test article with relation to a reference point, or the center line of the mold cavity 10. By this accurate positioning of a test article in the mold cavity where it is properly located or centered with relation to given reference points or surfaces in the apparatus, any matrix formed therearound will have the test article properly centered, or located therein. Adjustments can be made for the deviation of the test article from the fixed dimensions desired therefor, within the tolerance limits provided for the test article, in the setting of the test article in the mold cavity. This accurate positioning of the test article in the matrix will then permit the test article to be accurately finished with reference to a center line of the test article, or for a so-called "stacking" point for a jet turbine blade or bucket.

In prior constructions, the deviations in tolerance of the test article from a fixed standard have not been taken into consideration, and it frequently has been necessary to have a final polishing or grinding action performed on the air foil section of the test article, such as a jet blade, after the root portions have been finished. This has been required because the jet blade has not been properly positioned in the matrix.

The apparatus of the invention will provide accurate positioning of a jet blade or bucket with relation to the stacking point for the air foil of the jet blade or bucket and permit the final machining of the root of the blade, for example, to be performed with relation to the actual center, or stacking point of the test article.

Reference now is particularly directed to the embodiment of the invention shown in FIGS. 1 and 2 of the drawings and this apparatus is indicated as a whole by the number 90. In this instance, a base or suitable frame member 100 is provided that has a pair of uprights 101 and 102 secured thereto and extending upwardly therefrom in spaced, parallel relationship. Normally the uprights extend vertically. These uprights 101 and 102 support or position a pair of suitable upper and lower support means 103, 103a and 104 and 104a in vertically and horizontally spaced relationship but also in horizontally aligned relation with regard to support cartridges positioned in corresponding relationship on the uprights. These support cartridges, or equivalent support members, are secured to the uprights 101 and 102, as by means of end caps 120 contoured to engage opposed side portions of the uprights 101 and 102 which in this instance are shown to be of substantially square shape in horizontal section. The uprights as secured in position provide convenient corner members that can be seated in correspondingly shaped recesses 121 formed in side portions of the support cartridges 103 through 104. Suitable cap screws or bolts 122 secure the end caps to the support cartridge means shown. Thus by using the upper surface of the base 101 as a reference surface and with such surface being accurately formed to flat shape, the support cartridges 103, 104, 103a and 104a can be positioned in common horizontal planes at accurately spaced vertical distances from each other. A matrix forming mold 109 having a vertically extending open ended mold cavity 110 provided therein is positioned by and snugly extends between a pair of locator means in this instance plates 115 and 116 that are secured to locator boxes 123 and 124. These boxes 123 and 124 are individually secured to and supported by the uprights 101 and 102 by end caps (not shown) in manners similar to the support cartridges 103, 104. The adjacent inner faces of these locator plates 115 and 116, indicated at 117 and 118, are accurately formed faces that engage the matrix mold 109 and determine the fixed positioning thereof.

The test article positioning is by a template or gage blade 111 slidably carried by the support cartridge 103 on the lower surface thereof, and a similar template or gage blade 112 slidably carried on the support cartridge or support member 104 on the lower surface thereof for movement on a common axis extending transversely of the apparatus 90. These templates have gaging or measuring surfaces 125 and 126, respectively, formed on their adjacent inner ends for accurate contact with a member, such as a jet or turbine blade or bucket 127, that is to be positioned in the matrix mold 109 of the invention. Such jet blade normally has a base or root portion indicated at 128 that requires additional machining operations thereon for finishing it, whereas the air foil contour or section 129 of this jet blade preferably is of finished contour when positioned in the apparatus of the invention. Additional gaging templates, or gage blades 130 and 131 are slidably carried by the support cartridges 103a and 104a on the upper surfaces thereof and likewise have inner ends contoured to engage the air foil section 129 of the article being tested at that particular portion thereof.

The two sets of templates 111 and 112 and 130 and 131 are adapted to engage spaced vertical sections of the air foil section 129 of a jet blade, or bucket, for example, and position it in an accurate vertical and horizontal relationship to the support cartridges or support means provided in the apparatus of the invention. Furthermore, these templates are adapted to be adjusted laterally with relation to the uprights 101 and 102 to locate the test article accurately with relation to the mold cavity. In testing and working with jet blades and similar articles, the articles usually are centered with relation to a so-called stacking point and in this instance, one of the templates 111 is shown provided with a positioning bar 132 that has a locator pin or nub 133 thereon. Thus a predetermined portion of the jet blade 127 will engage this pin 133 to accurately position the test article and the stacking point thereof with regard to the template 111 whereby accurately positioning these templates with regards to the matrix mold 109 will accurately center or locate the test article with relation to the matrix formed therearound by pouring a molten matrix forming material into the mold cavity 110. By positioning the test article with a vertical axis in a vertically open mold cavity, this matrix forming material will flow smoothly around the air foil contour of the jet blade and will solidify in tight engagement therewith, as pointed out hereinafter in more detail.

In order to obtain the desired cooling action on the matrix material, cooling coils 134 and 135 are suitably received within cavities provided in the locator boxes 123 and 124 and preferably with these coils being embedded in metal which has been poured therearound when liquid and which solidifies in good heat flow relationship between the cooling coils 134 and 135, the carrying metal, and the locator boxes in which they are positioned or received. Suitable cooling fluid is supplied to the cooling coils. Likewise, the locator plates 115 and 116 are in good heat transfer contact with the locator boxes whereby heat will be withdrawn rapidly from the matrix mold 109 when warm matrix forming material is poured therein. Preferably the matrix to be formed around the jet blade 127 is made from a very low melting metal, such as one that can be melted in boiling water, or even at lower temperatures. By withdrawing heat rapidly from this matrix forming material and the mold 109, any excessive temperature change in these members is avoided, and likewise the templates 111 and 112 and 130 and 131 are not effected seriously by the elevated temperature condition to vary the accurate positioning of the test article in the mold cavity.

The desired positive locating action for a test article, whether it is on a centering line thereof, or with relation to a so-called stacking point therefor is obtained by forming the templates to accurate lengths and with the laterally outer surfaces on the support cartridges 103 and 104, as indicated at 113 and 114, being accurately formed and normally lying in vertical planes. Similar locator, or gaging surfaces are provided on the templates and are indicated at 115 and 116 in the drawings. Likewise, the distances between the faces 117 and 118 on the locator plates with relation to these gaging surfaces 113 and 114 are known so that the exact relationship of the mold cavity 110 with relation to the gaging surfaces is known.

In order to aid in accurately determining the position of the templates 111 and 112, for example, gages 136 are secured to each of these templates and extend with their operative spindle or plunger 137 parallel to the axis of each of the carrier templates. The gages are positioned on the templates by suitable members, such as brackets 138. Accurate adjustment or positioning means are provided for operatively connecting members, such as the support cartridges or support means in the apparatus of the invention, and the templates for accurately moving the templates short distances along their axes. In this instance, such means comprise positioning brackets 139 that may be pivotally carried on the upper surfaces of the support cartridges 103 and 104 and be pivotally carried by the under or lower surfaces of the support cartridges 103a and 104a, as best shown in FIG. 2. Each of these brackets 139 carries an adjustment screw 140 in engagement with a tapped aperture formed therein. Each of these screws 140 extends from the carrier bracket in such a manner as to engage, or bear against the gaging surfaces 115 and 116 provided on the templates and being movable through small increments of arcuate movement by control knobs 141 so that the templates can be moved short distances with relation to the carrier or support plate to inch or move the templates laterally inwardly of the apparatus.

The lower end of the mold cavity 110 is closed, as by means of suitable gates, or templates 142 and 143 slidably carried on the support cartridges 103 and 104a above and independent of the templates 130 and 131 received thereon. Any suitable means (not shown) may secure the gates 142 and 143 in position. If desired, in some instances these gaging templates may be formed integrally with the templates 130 and 131, if temperature variations on these templates are not deterimental in flow of the heated matrix forming material thereto.

The matrix mold 109 is best shown in FIG. 2 as being supported on brackets or arms 144 and 145 that are secured to the lower support cartridges 103a and 104a to have the matrix mold 109 rest thereon. End plates 146 may be suitably supported in the apparatus, as by being carried by the locator boxes 123 and 124 and extending laterally inwardly of the apparatus therefrom The matrix mold 109 is forced against these end plates 146 by means of a set screw 147 carried on a lock arm 148. This lock arm 148 preferably is carried by one of the locator boxes 123 and 124 in pivotal association therewith and is removably engaged with the opposite locator box, as by means of a slot 149 engaging a set screw or pin 150 on the opposite locator box whereby the matrix mold can be tightly secured between the positioning means provided therefor. Naturally, the various support cartridges or support means in the invention, and the locator boxes and similar members in the apparatus can be changed for positioning different test articles in the apparatus of the invention. These members are all in removable engagement with the uprights 101 and 102 and are accurately positioned thereby for embedding a given article in a matrix.

FIG. 3 of the drawings shows that the matrix mold 109 in this instance is rectangular and the end or outer walls thereof would be ground or otherwise accurately formed to flat surfaces and with the mold cavity 110 being accurately located with relation to these end faces for positioning this mold properly for receiving a test article therein so that such test article will be accurately located in the mold cavity and in the matrix produced therein in which the test article is embedded.

FIGS. 4 and 5 show another type of apparatus of the invention, and in this instance suitable uprights 201 and 202 are provided and have sets of upper and lower templates 211, 212 and 230 and 231 provided therein and adjustably and slidably carried by suitable support cartridges, or similar members like those previously described. In all events, the test article in this instance shown as 227 and again is a jet blade or bucket or the like. Such test article is positioned by means of a locator pin 260 that is carried, for example, on one of the templates 212.

In this instance, a cylindrical matrix 261 is to be formed and is shown in FIG. 5 for embedding a section of the test article 227 therein. A mold cavity 210 is formed in a mold plate 209 that extends between and is suitably secured to the uprights to be fixedly positioned thereby. A cooling coil 262 is shown embedded in suitable matrix material 263 received in a recess formed in the mold plate 209. A unitary gate plate 264 is provided and is slidable along the longitudinal axis of the mold plate 209 and secured in place in any conventional manner. The gate plate prevents flow of the matrix material out of the lower portion of the mold cavity 210 so that an annular matrix will be formed from molten matrix material poured into the mold cavity for positioning the test article 227 therein. The matrix 261 can be secured in a chuck, for instance, for turning, grinding, or otherwise machining exposed portions of the test article, as desired.

From the foregoing, it is believed that it will be seen that a novel and improved type of apparatus has been provided for positioning test articles so that they can be accurately located in a matrix formed therearound regardless of any variations in tolerance of such test article from the normal fixed size thereof. The apparatus of the invention is relatively easy to adjust and set and permits the finish machining of a base or root portion of the test article, for example without any further finishing of the air foil portion of the jet blade. Hence it is believed that the objects of the invention have been achieved.

Further details of typical uprights, support cartridges and templates, and the assembly of such members are shown in my copending application Ser. No. 637,404, filed January 31, 1957, now Patent 2,964,850 issued December 20, 1960.

While several complete embodiments of the invention have been disclosed herein, it will be appreciated that modification of these particular embodiments of the invention may be resorted to without departing from the scope of the invention as defined in the appended claims.

What is claimed is:

1. Apparatus for centering articles in a matrix comprising a frame having a pair of spaced uprights thereon, upper and lower support means operatively carried by each of said uprights in vertically spaced horizontally aligned and spaced relation, a matrix mold with a vertically open mold cavity therein fixedly and operatively secured to and extending between said uprights to be positioned thereby, cooling means operatively associated with said matrix mold, a template slidably carried by each of said support means and extending both laterally inwardly and outwardly therefrom, the adjacent laterally inner edges of said templates being contoured to engage a test article, means operatively carried by one of said templates to position a test article accurately thereon to extend into said mold cavity, the laterally outer surfaces of said support means being gaging surfaces in the apparatus and said templates having laterally outer gaging surfaces thereon, adjustable means operatively connecting each of said templates to its said support means to position its laterally inner face accurately with relation to a reference on a test article positioned by one of said templates whereby a test article can be accurately located in said mold cavity and matrix material can be poured into said mold cavity to embed a test article therein, and individual gage means connected between said templates and said support means to enable said templates to be set in accurate balanced relation to said mold cavity.

2. Apparatus for centering articles in a matrix comprising a frame having a pair of spaced uprights thereon, upper and lower support means operatively carried by each of said uprights in vertically spaced horizontally aligned and spaced relation, a matrix mold with a vertically open mold cavity therein being fixedly positioned in the apparatus between said uprights, a template slidably carried by each of said support means and extending both laterally inwardly and outwardly therefrom, the adjacent laterally inner edges of said templates being contoured to engage a test article, means operatively associated with one of said templates to position a test article accurately to extend into said mold cavity, the laterally outer surfaces of said support means being gaging surfaces in the apparatus and said templates having laterally outer gaging surfaces thereon, and adjustable means operatively connecting each of said templates to its said support means to position its laterally inner face accurately with relation to a reference on the test article whereby a test article can be located accurately in said mold cavity and matrix material can be poured into said mold cavity to embed a test article in a desired position in a matrix formed therearound.

3. Apparatus for centering articles in a matrix comprising a support including a pair of spaced uprights, upper and lower support means operatively carried by each of said uprights in vertically spaced horizontally aligned and spaced relation, a matrix mold with a vertically open mold cavity therein operatively secured to and extending between said uprights to be fixedly positioned, a template slidably carried by each of said support means and extending laterally inwardly therefrom, the adjacent laterally inner edges of said templates being contoured to engage a test article, a test article being positioned to extend into said mold cavity, the laterally outer surfaces of said support means being gaging surfaces in the apparatus and said templates having gaging surfaces adjacent said support means gaging surfaces, and adjustable means operatively connecting each of said templates to its said support means to position its laterally inner face accurately with relation to said support means gaging surface whereby a test article can be centered in said mold cavity and matrix material can be poured therearound to embed a test article centrally of the formed matrix.

4. Apparatus for centering articles in a matrix comprising a frame having a pair of spaced uprights thereon, upper and lower support cartridges operatively carried by each of said uprights in vertically spaced horizontally aligned and spaced relation, a locator member operatively secured to and extending between the said upper and lower support cartridges on each of said uprights to position contact faces on said locator member in parallel vertical planes, a matrix mold with a vertically open mold cavity therein being secured between said locator members and to be positioned by said contact faces thereof, cooling means associated with said locator members, a template slidably carried by each of said support cartridges and extending both laterally inwardly and outwardly therefrom, the adjacent laterally inner edges of said templates being contoured to engage a test article, means operatively carried by one of said templates to position a test article thereon to extend into said mold cavity, the laterally outer surfaces of said cartridges being gaging surfaces in the apparatus and said templates having laterally outer gaging surfaces thereon, and adjustable means operatively connecting each of said templates to its said support cartridge to position its laterally inner face accurately with relation to a reference on a test article whereby a test article can be centered in said mold cavity and matrix material can be poured into said mold cavity.

5. Apparatus for centering articles in a matrix comprising a frame having a pair of spaced uprights thereon, upper and lower support cartridges operatively carried by each of said uprights in vertically spaced horizontally aligned and spaced relation, a locator member operatively secured to and extending between the said upper and lower support cartridges on each of said uprights to position contact faces on said locator members in parallel vertical planes, a matrix mold with a vertically open mold cavity therein being secured tightly between said locator members and being positioned thereby, a template slidably carried by each of said support cartridges and extending both laterally inwardly and outwardly therefrom, the adjacent laterally inner edges of said templates being contoured to engage a test article, means operatively carried by one of said templates to position a test article thereon to extend into and through said mold cavity, means operatively associated with the lower surface of said mold to close the cavity therein around a test article, the laterally outer surfaces of said cartridges being gaging surfaces in the apparatus and said templates having laterally outer gaging surfaces thereon, adjustable means operatively connecting each of said templates to its said support cartridge to position its laterally inner face accurately with relation to a reference on a test article, and individual gage means connected between said templates and said support means to enable said templates to be set in centered relation to said mold cavity.

6. Apparatus for locating articles in a mold cavity to form a matrix around such article and comprising a pair of uprights, a plurality of support means secured in vertically spaced relation to said uprights, a template slidably carried by each of said support means for movement on a transverse axis of the apparatus, said templates extending laterally inwardly of the apparatus to engage and position a test article by gaging inner surfaces on such templates, a mold plate operatively positioned by said uprights and extending therebetween, said mold plate having a mold cavity therein positioned between said uprights, means associated with a said template to position a test article accurately with relation thereto to extend into said mold cavity, and means operatively engaging said support means and said templates to position the test article in a desired accurate position in said mold cavity by the gaging surfaces of said templates by adjustment of the positions of said template on said support means.

7. Apparatus for locating articles in a mold cavity to form a matrix around such article and comprising a pair of uprights, a plurality of support means secured in vertically spaced relation to said uprights, a template slidably carried by each of said support means for movement on a transverse axis of the apparatus, said templates extending laterally inwardly of the apparatus to engage and position a test article by gaging inner surfaces on such templates, a mold having a vertically open mold cavity operatively and fixedly positioned by said uprights and extending therebetween, means associated with a said template to position a test article accurately with relation thereto to extend into said mold cavity, and means operatively engaging said support means and said templates to position the test article in a desired accurate position in said mold cavity by the gaging surfaces of said templates by adjustment of the positions of said template on said support means, said support means and said templates having gaging surfaces thereon with which said last-named means are operatively associated.

8. Apparatus for centering articles in a matrix comprising a frame having a pair of spaced uprights thereon, upper and lower support means operatively carried by each of said uprights in vertically spaced but horizontally aligned and spaced relation, a matrix mold with a vertically open mold cavity therein fixedly and operatively secured to and extending between said uprights to be positioned thereby, a template slidably carried by each of said support means and extending laterally inwardly therefrom, the adjacent laterally inner edges of said templates being contoured to engage a test article, means operatively carried by one of said templates to position a test article accurately thereon to extend into said mold cavity, the laterally outer surfaces of said support means being accurate vertically directed gaging surfaces in the apparatus and said templates having accurate vertically directed gaging surfaces thereon adjacent said support means gaging surfaces, adjustable means operatively connecting each of said templates to its said support means to position its laterally inner face accurately with relation to a reference on a test article positioned by one of said templates and hence accurately with regard to the mold cavity whereby a test article can be accurately located in said mold cavity and matrix material can be poured into said mold cavity to embed a test article therein, and individual gage means connected between said templates and said support means to enable said templates to be set in accurate balanced relation to said mold cavity, said templates being of known accurate lengths and said support means gaging surfaces being of known accurate distances from a reference on a test article carried by said one of said templates.

9. Apparatus for centering articles in a matrix comprising a frame having a pair of spaced uprights thereon, upper and lower support cartridges operatively carried by each of said uprights in vertically spaced horizontally aligned and spaced relation, a locator member operatively secured to and extending between the said upper and lower support cartridges on each of said uprights to position contact faces on said locator member in parallel vertical planes, a matrix mold with a vertically open mold cavity therein and having flat end faces being secured between and in contact with the contact faces of said locator members to be positioned thereby in accurate fixed relation to said support cartridges, a template slidably carried by each of said support cartridges and extending both laterally inwardly and outwardly therefrom, the adjacent laterally inner edges of said templates being contoured to engage a test article, means operatively carried by one of said templates to position a test article thereon to extend into said mold cavity, the laterally outer surfaces of said cartridges being gaging surfaces in the apparatus and said templates having laterally outer gaging surfaces thereon, and adjustable means operatively connecting each of said templates to its said support cartridge to position its laterally inner face accurately with relation to a reference on a test article whereby a test article can be accurately positioned in said mold cavity and matrix material can be poured into said mold cavity to set the article in a predetermined position in the matrix produced.

References Cited in the file of this patent

UNITED STATES PATENTS

| | | |
|---|---|---|
| 235,626 | Foster | Dec. 21, 1880 |
| 2,748,433 | Preston | June 5, 1956 |
| 2,879,602 | Powers | Mar. 31, 1959 |